United States Patent [19]

Nakai et al.

[11] Patent Number: 4,921,831

[45] Date of Patent: May 1, 1990

[54] METHOD FOR PREPARING ACTIVE CARBONS

[75] Inventors: Masayuki Nakai; Takeshi Yoshida; Katsumi Tomura, all of Chiba, Japan

[73] Assignee: Idemitsu Kosan Co., Ltd., Tokyo, Japan

[21] Appl. No.: 259,592

[22] Filed: Oct. 19, 1988

[30] Foreign Application Priority Data

Nov. 10, 1987 [JP] Japan .................................. 62-282152

[51] Int. Cl.$^5$ ...................... C01R 31/10; C01R 31/02; B01J 20/20
[52] U.S. Cl. .................. 502/418; 502/416; 502/430; 502/437
[58] Field of Search ............................... 502/416-418, 502/428, 430, 431, 437

[56] References Cited

U.S. PATENT DOCUMENTS 4,268,417 5/1981 Messer ............................... 502/430
4,410,472 10/1983 Grubbs et al. ....................... 502/418

FOREIGN PATENT DOCUMENTS 1263623 10/1986 U.S.S.R. ............................. 502/416

Primary Examiner—Paul E. Konopka
Attorney, Agent, or Firm—Antonelli, Terry & Wands

[57] ABSTRACT

A method for preparing active carbon, which comprises:
(a) a pulverization step of pulverizing a non-caking coal to pulverized particles having an average particle size of not larger than 10 μm;
(b) a granulation step of granulating the resulting pulverized particles to granules;
(c) a carbonization step of carbonizing the resulting granules; and
(d) an activation step of activating the resulting carbonized granules.

14 Claims, 2 Drawing Sheets

METHOD FOR PREPARING ACTIVE CARBONS

BACKGROUND OF THE INVENTION (a) Field of the Invention

The present invention relates to methods for preparing active carbons which can be used for water treatments, gas treatments. etc. More specifically, the present invention relates to methods for preparing active carbons having high strengths and high adsorption activities with a good productivity.

(b) Description of the Related Art

Known methods for preparing an active carbon by using a coal as a starting material comprise a step of pulverizing the starting coal to pulverized particles, a step of granulating the resulting pulverized particles, a step of carbonizing the resulting granules, and a step of activating the resulting carbonized granules.

In some of the known methods for preparing granular active carbons, as described in Japanese patent Application Publication No.48-41210, etc., caking coals are used as the starting coals in order to obtain the active carbons having such high strength as required in uses of the active carbons. However, such known methods have disadvantages in that :

it is required to employ a fusion-prevention treatment for eliminating the tackiness of the surface of the granules obtained in the granulating step by oxidizing their surface in order to prevent the granules having a caking property from sticking with one another; it is necessary to increase temperature slowly in the carbonizing step in order to prevent the granules from foaming in the carbonization step: and a long activation time is required to obtain enough surface area required of active carbons.

In addition, those methods have some other disadvantages as follow. Since the particle size of the particles obtained by pulverizing the starting coal is as large as 100 mesh (0.140 mm), the numbers of the contact points between the sub-particles in the granules granulated therefrom as well as in the carbonized granules are small, causing the necessity for the use of a bituminous material such as a pitch. etc. as a binder for attaining an effective granulation. Further, the use of such a bituminous material as the binder is unfavorable to the activating reactions because the surface pores that the starting coal originally has are blocked by the bituminous matters having high carbon residue contents in the carbonization step, and it is difficult to prepare granules having particle sizes of not more than 1 mm because the particle sizes of the sub-particles that are to be granulated are large.

SUMMARY OF THE INVENTION

An object of the present invention is to provide an improved method for preparing active carbons, the methods having advantages in that each of said methods comprises uncomplicated steps, the activation of the carbonized granules can be easily effected, and a high productivity of said active carbons can be attained.

Another object of the present invention is to provide a method for preparing active carbons that are granular and have high strength and superior adsorption activity.

Another object of the present invention is to provide a method for preparing spherically granular active carbons having high sphericity.

More other object of the present invention is to provide a method for preparing spherically granular active carbons having small particle sizes.

We have studied to solve the problems described above. As the result of our researches, we have found that the problems described above can be solved by using non-caking coals or mixed coals mainly comprising non-caking coals as the starting coals and by pulverizing the starting coals to particles having a specified average particle size, and we have eventually completed the present invention.

That is, the present invention provides a method for preparing active carbon, which comprises:

(a) a pulverization step of pulverizing a non-caking coal to pulverized particles having an average particle size of not larger than 10 $\mu$m:

(b) a granulation step of granulating the resulting pulverized particles to granules:

(c) a carbonization step of carbonizing the resulting granules: and (d) an activation step of activating the resulting carbonized granules.

By using this method of the present invention, granular active carbons, especially spherical active carbons, having excellent activity and high strength can be prepared with good productivity, by the effects of pulverizing non-caking starting coals pulverized particles having an average particle size of not larger than 10 $\mu$m.

Further, the present invention provides a method for preparing active carbon, which comprises:

(a) a pulverization step of pulverizing a coal composition comprising a non-caking coal and a caking coal whose content in the coal composition is not higher than 40% by weight to pulverized particles having an average particle size of not larger than 10 $\mu$m:

(b) a granulation step of granulating the resulting pulverized particles to granules:

(c) a carbonization step of carbonizing the resulting granules: and (d) an activation step of activating the resulting carbonized granules.

By using this method of the present invention, active carbons having higher strength can be prepared with good productivity without requiring complicated carbonization step nor complicated activation step, by the effects of using a coal composition comprising a non-caking coal and a caking coal whose content in the coal composition is not more than 40% by weight, instead of the non-caking coal, as the starting coal in the first invention.

DESCRIPTION OF THE PREFERRED EMBODIMENTS

Figure 1:
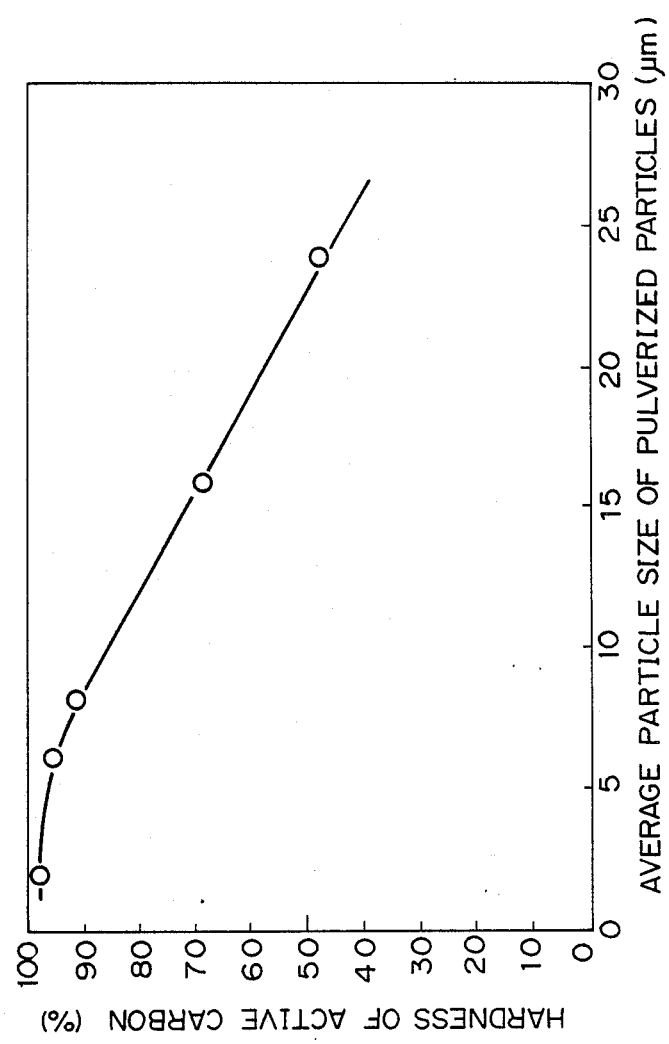
FIG. 1 is a graph showing the relation between the average particle size of pulverized particles of the starting coal and the hardness of the active carbons obtained.

The illustrative examples of the non-caking coals that can be used as the starting coals in the present invention include brown coals, lignites, sub-bituminous coals, and the like. These non-caking coals may be used each independently or as mixtures thereof.

Since these non-caking coals have fairly high reactivity towards activating agents such as steam carbon dioxide gas, etc., it is easy to obtain active carbons having high adsorption activities. Furthermore, because they neither soften nor melt and neither swell nor foam, being different from caking coals, the granulated particles can be directly carbonized without a pretreatment process for the fusion prevention. Also, the rate of increasing temperature used in the activation step is not restricted because neither swelling nor foaming occurs. Consequently, the process for preparing the active carbons can be simplified and a good productivity can be attained.

After drying at need, the starting coal is pulverized to particles having an average particle size of not larger than 10 $\mu$m, preferably not larger than 6 $\mu$m more preferably not larger than 2 $\mu$m. In the case where two or more kinds of the coals are used as the starting coal, they may be pulverized after previously being mixed one another, or they may be separately pulverized followed by mixing uniformly the resulting pulverized particles together.

The pulverization can be easily conducted by using grinding machines, including ball mills, media-mixing-type grinders etc. The pulverization may also be conducted in the presence of a grind-assisting agent such as methanol or ethanol.

The starting coal may be used as it is without drying if the water content of the starting coal is in the range wherein troubles can be avoided, the troubles including aggregation of the pulverized particles by the actions of the water content in the pulverization step.

In the case where the water content of the starting coal is so high as to cause an obstacle in pulverizing step, the starting coal is previously dried before pulverization.

The pulverization of the starting coals to particles having an average particle size of not larger than 10 $\mu$m can increase the numbers of the contact points per unit weight between the particles, resulting in an increased cohesive power between the sub-particles in the granules etc., thereby spherical active carbons having high strength can be obtained. In addition, the pulverization of the inuniform starting coals can makes the resulting active carbons obtained have homogeneous properties of active carbons.

The pulverized particles of the starting coals are granulated to granules, preferably to spherical granules, by using a granulation technique such as mixing-granulation techniques or rolling-granulation techniques.

Any known granulation technique such as extrusion techniques, compression techniques, mixing techniques, rolling techniques, etc. may be employed. By using mixing techniques or rolling techniques the particles can be efficiently granulated into spherical form at low cost.

Water or hydrocarbon oils having a low viscosity and giving a low carbon residue content after heating can preferably be used as a binder in the granulation.

In the case where water is used as the binder, CMC (cellulose methyl carboxylates), PVA, molasses, starches, sulfite pulp waste liquors or the like may be added to the granulation system in order to improve the physical strength of the resulting granules so that the granules can tolerate the operations that are to be carried out until the granules are carbonized. Also, a small amount of surface active agents may be added in order to improve the conformability between water and the coals.

Hydrocarbon oils have a good conformability to coals, and therefore their use as the binder permits to granulate the particles to spherical granules, including small spherical ones having particle sizes of about 0.1 mm. Suitable hydrocarbon oils are those whose viscosity measured at granulation temperatures used is not more than 2000 cSt. These binders are decomposed or vaporized by heating and hardly remain as carbonized products on the surface of the granules.

On the contrary, bituminous hydrocarbon oils, such as asphalts, tars, pitches, etc., are pyrolyzed to leave carbonaceous matters by heating, and the resulting carbonaceous matters improve the strength of the carbonized granules. However, the resulting carbonaceous matters blocks the pores that the coals originally have, the advantages of using the non-caking coals, which have low ranks of coalification and are easy to activate, as the starting coals cannot occasionally be realized.

The granules obtained in the granulation step are to be usually granules having particle sizes of not less than 0.1 mm, preferably spherical granules having particle sizes of not less than 0.5 mm and high sphericities.

If the particle sizes of the granules are too large, large granulators are to be required and the productivity would be decreased. In addition, it would be difficult to activate uniformly the granules. Therefore, it is preferred that the maximum particle size of the granules obtained is about 10 mm. The granules obtained are dried and are then carbonized by heating at temperatures of 500-1.000° C. under an inert gas atmosphere.

Suitable carbonization apparatus can be rotary kiln furnaces, Herreshoff multihearth furnaces, and the like.

The granules carbonized are activated by reacting with an activator such as steam, carbon dioxide, etc.

Suitable activation apparatus can be rotary kiln furnaces. Herreshoff multihearth furnaces, fluidized bed activation furnaces, etc., Activation conditions that are usually employed can be as follow : the temperatures : 800-1.000° C., the amount of the activator : 1-10 kg of steam per 1 kg of the carbonized granules, activation time : 1-10 hours.

Another method of the present of the present invention, which has been established in order to obtain improved active carbons having higher strength as compared to that of the active carbons obtained in the above described method of the present invention, is characterized by using a coal composition comprising the non-caking coal and a caking-coal whose content is not more than 40% by weight in the coal composition as the starting coal.

Some illustrative examples of the caking-coals to be used in the present invention include sub-caking coals, semi-caking coals, etc. The portion of the caking coals in the starting coals used is not more than 40% by weight, preferably not more than 30% by weight, more preferably not more than 25% by weight.

Mixing the caking-coals with the non-caking coals can improve the strength of the active carbons, while maintaining the effects as can be obtained in the first invention. However, if the portion of the caking-coals mixed is in excess of 40% by weight, the adsorption activities of the active carbons obtained would be lowered.

The caking-coals and the non-caking coals are mixed followed by pulverizing the resulting mixture to a pulverized particle size of not larger than 10 $\mu$m, or are pulverized separately to the respective pulverized particles having a particle size of not larger than 10 μm followed by mixing the resulting particles one another. The resulting pulverized particle of the mixed coals are used as the starting coal material in the granulation step.

The granulation step, the carbonization step, and the activation step used in the second invention can be carried out in the same manners as those in the first invention respectively.

The following examples are presented as specific illustrations of the present invention. It should be understood, however, that the invention is not limited to the specific details set forth in the examples.

EXAMPLES AND COMPARATIVE EXAMPLES

EXAMPLE 1

(1) Yallourn coal, one of the non-caking coals. having an ash content of 1.6%, a water content of 12%, and a free swelling index of zero (based on JIS M 8801) was used as a starting coal. It was pulverized to particles having an average particle size of 1.9 μm by using a media-mixing-type grinder. The average particle size was measured by using Granulometre 715(produced by CILAS CO., LTD.).

(2) To the resulting pulverized coal particles was added 41.0 g of water per 100 g of the coal, and the pulverized coal particles in the resulting mixture were granulated to spherical granules.

The resulting spherical granules were separated by sieving to obtain those in the fraction between 10 mesh (1.68 mm) and 16 mesh (1.00 mm). The resulting fraction of the granules was dried until the water content became 1-2 wt %.

(3) The spherical granules dried were carbonized by calcination in a flowing nitrogen gas at 800° C. in an electrical furnace.

(4) The carbonized granules were activated at 980° C. for 2 hours in the presence of an activator: i.e., in flowing steam whose flow rate was 1.5kg-steam / 1 kg of the carbonized granules used, in a rotary kiln to obtain an intended product.

Properties of the products were listed in Table 1.

EXAMPLE 2

The procedure of Example 1 was exactly repeated. except that the starting Yallourn coal was pulverized to particles having an average particle size of 6.2 μm by using a media-mixing-type grinder.

Properties of the product obtained are listed in Table 1.

EXAMPLE 3

The procedure of Example 1 was exactly repeated, except that the starting Yallourn coal was pulverized to particles having an average particle size of 8.1 μm by using a media-mixing-type grinder.

Properties of the products obtained are listed in Table 1.

COMPARATIVE EXAMPLE 1

The procedure of Example 1 was exactly repeated, except that the starting Yallourn coal was pulverized to particles having an average particle size of 24 μm by using a ball mill.

Properties of the product obtained are listed in Table 1.

COMPARATIVE EXAMPLE 2

The procedure of Example 1 was exactly repeated. except that the starting Yallourn coal was pulverized to particles having an average particle size of 24 μm by using a ball mill.

Properties of the product obtained appear in Table 1.

EXAMPLE 4

The procedure of Example 1 was exactly repeated. except that the starting Yallourn coal gas pulverized to particles having an average particle size of 6.5 μm by using a media-mixing-type grinder, 43g of a 5%- aqueous solution of CMC (cellulose methyl carboxylates) per 100 g of the pulverized coal was added before the granulation.

Properties of the product obtained are listed in Table 1.

EXAMPLE 5

The procedure of Example 1 was exactly repeated, except that the starting Yallourn coal was pulverized to particles having an average particle size of 2.8 μm by using a media-mixing type grinder; and 40 g of Diana-oil E-100 [made by Idemitsu Kosan Co. Ltd.. an aromatic-base oil having a viscosity of 100 cSt as measured at 40° C., a carbon residue content of 0.19% (based on JIS K 2270)] per 100 g of the pulverized coal gas added before the granulation, and the sieved granules in the fraction between 32 mesh (0.50 mm) and 60 mesh (0.25 mm) was carbonized.

Properties of the product are listed in Table 1.

COMPARATIVE EXAMPLE 3

The procedure of Example 1 was exactly repeated, except that sub-caking Cerrejon coal having an ash content of 1.0%, a water content of 5.5%, and a free swelling index of 1 1/2 that was previously delimed by a gravity concentration technique was used as the starting coal.

The procedure of Example 1 was exactly repeated, except that the Cerrejon coal was pulverized to particles having an average particle size of 7.8 μm by using a media-mixing type grinder.

Properties of the product obtained are listed in Table 1.

EXAMPLE 6

The procedure of Example 1 was exactly repeated. except that a mixed coal that comprises the Yallourn coal and 10% (by weight of the carbon content on dry base) of sub-caking Cerrejon coal having an ash content of 1.0%, a water content of 5.5%, and a free swelling index of 1 1/2 that was previously delimed by a gravity concentration technique, was used as the starting coal, and it was pulverized to particles having an average particle size of 7.8 μm.

Properties of the product obtained are listed in Table 2.

EXAMPLE 7

The procedure of Example 1 was exactly repeated, except that a mixed coal comprising the Yallourn coal and 25% (by weight of the carbon content on dry base) of the Cerrejon coal was used as the starting coal, and it was pulverized to particles having an average particle size of 8.3 μm.

Properties of the product obtained are listed in Table 2.

COMPARATIVE EXAMPLE 4

The procedure of Example 1 was exactly repeated, except that a mixed coal comprising the Yallourn coal and 50% (by weight of the carbon content on dry base) of the Cerrejon coal was used as the starting coal, and it was pulverized to particles having an average particle size of 7.7 μm.

Properties of the product obtained are listed in Table 2.

COMPARATIVE EXAMPLE 5

The procedure of Example 1 was exactly repeated, except that a mixed coal comprising the Yallourn coal and 75% (by weight of the carbon content on dry base) of the Cerrejon coal was used as the starting coal, and it was pulverized to particles having an average particle size of 8.0 μm.

Properties of the product obtained are listed in Table 2.

TABLE 1

| | | Properties of the spherical active carbons | | | | | | |
|---|---|---|---|---|---|---|---|---|
| | | Pulverized particles, granules | | | Carbonized product | | Active carbons | |
| Items | Starting Material | Average particle size of the pulverized particles (μm) | Binders for granulation | Sieve fraction of the granular (mm) | Appearance of the carbonized product (aggregation, foaming) | Hardness[1] (%) | Hardness[1] (%) | amount of[1] iodine adsorbed (mg/g) | Specific[2] surface area (m²/g) |
| Example 1 | Yallourn | 1.9 | water | 1.00 ~ 1.68 | none | 99 | 98 | 1,118 | 1,080 |
| Example 2 | Yallourn | 6.2 | water | 1.00 ~ 1.68 | none | 98 | 96 | 1,120 | 1,095 |
| Example 3 | Yallourn | 8.1 | water | 1.00 ~ 1.68 | none | 97 | 92 | 1,146 | 1,100 |
| Comparative example 1 | Yallourn | 16 | water | 1.00 ~ 1.68 | none | 78 | 69 | 1,112 | 1,075 |
| Comparative example 2 | Yallourn | 24 | water | 1.00 ~ 1.68 | none | 59 | 48 | 1,090 | 1,050 |
| Example 4 | Yallourn | 6.5 | CMC 5% aqueous solution | 1.00 ~ 1.68 | none | 98 | 96 | 1,115 | 1,090 |
| Example 5 | Yallourn | 2.8 | Diana-oil E-100 | 0.25 ~ 0.50 | none | 98 | 95 | 1,142 | 1,105 |
| Comparative example 3 | Cerrejon coal | 7.8 | water | 1.00 ~ 1.68 | observed | 99 | 98 | 718 | 690 |

[1]JIS K 1474 a method for testing granular active carbons
[2]BET surface area by N₂ adsorption

TABLE 2

| | Properties of the spherical active carbons | | | | Appearance and property of carbonized product | | Properties of active carbon | |
|---|---|---|---|---|---|---|---|---|
| | Starting material The ratio of Yallourn coal/ Cerrejon coal | Pulverized particles, granules | | | | | | |
| | | Average particle size of the pulverized particles (μm) | Binders for granulation | Sieve fraction of the granular (mm) | Appearance of the carbonized product (aggregation, foaming) | Hardness(1) (%) | Hardness(1) (%) | Amount of(1) iodine adsorbed (mg/g) | Specific(2) surface area (m²/g) |
| Example 3 | 100/0 | 8.1 | water | 1.00 ~ 1.68 | none | 97 | 92 | 1,146 | 1,100 |
| Example 6 | 90/10 | 7.8 | water | 1.00 ~ 1.68 | none | 98 | 93 | 1,130 | 1,076 |
| Example 7 | 75/25 | 8.3 | water | 1.00 ~ 1.68 | none | 98 | 95 | 1,053 | 1,002 |
| Comparative example 4 | 50/50 | 7.7 | water | 1.00 ~ 1.68 | none | 99 | 97 | 785 | 763 |
| Comparative example 5 | 25/75 | 8.0 | water | 1.00 ~ 1.68 | observed | 99 | 98 | 722 | 698 |
| Comparative example 3 | 0/100 | 7.8 | water | 1.00 ~ 1.68 | observed | 99 | 98 | 718 | 690 |

(1)JIS K 1474 a method for testing granular active carbons
(2)BET surface area by N₂ adsorption In Examples 1–8 and Comparative examples 1 and 2, Yallourn coal, a non-caking brown coal whose rank of coalification is low, was used as a starting material, and it was pulverized to particles having average particle sizes of 1.9, 6.2, 8.1, 16, and 24 μm, respectively. The respective pulverized particles obtained were granulated to spherical granules by a wet method by using water as a binder. The respective granular products obtained were dried, carbonized, and then activated with steam to obtain active carbons. As the result, it was found that the smaller the average particle size of the pulverized particles, the higher the hardness of the carbonized granules as well as the hardness of the active carbons obtained by activating the carbonized granules.

The relationship between the average particle size of the pulverized particles and the hardness of the active carbon obtained is shown in FIG. 1.

The strength of the active carbons is represented by the hardness of those that was measured by a method based on JIS K 1474, a method for testing the hardness of granular active carbons. The strength that is usually required for granular active carbons corresponds to the hardness of not less than 90%.

As shown in the figure, there is a good relation between the average particle size of the pulverized particles obtained from the same starting coal and the hardness of the active carbons obtained. The result shows that the granular active carbons having the hardness of not less than 90%, which corresponds to the strength that is demanded as that of usual granular active carbons, were obtained even in the cases that a non-caking coal was used as a starting material if it was pulverized to particles having an average particle size of not larger than 10 μm.

The result also shows that the strength of the spherically granular active carbon became higher as the starting coal was pulverized to smaller particles. When a coal was pulverized to particles having an average particle size of 6 μm, spherically granular active carbons having a hardness of 95% was obtained, while the same coal provided spherically granular active carbons having a hardness of 98% when the coal was pulverized to an average particle size of 2 μm.

On the contrary, the result shows that in the cases that the respective average particle sizes were 16 μm and 24 μm, the respective hardnesses of the corresponding active carbons obtained were 69% and 48%, indicating that satisfactory active carbons having a hardness of not less than 90% could not be obtained from the pulverized particles having an average particle size of more than 10 μm.

In Example 4, the pulverized particles of Yallourn coal having an average particle size of 6.5 μm were granulated by using a 5%-CMC aqueous solution as a binder, while, in Example 5, those having an average particle size of 2.8 μm were granulated by using a hydrocarbon oil having a low carbon residue content as a binder. In both cases, highly spherical granules were easily obtained and the active carbons having a high hardness and an high adsorption activity were obtained as in Examples 1–3.

In Comparative example 3, Cerrejon coal, one of sub-caking coals, was used as a starting material, and it was pulverized to particles having an average particle size of 5.8 μm. They were granulated by using water as a binder, and the resulting granules were dried carbonized. and then activated by using steam as an activator. In this case, however, the granules were aggregated one another in the carbonization step, and the carbonized granules were foamed. In addition, the amount of iodine adsorbed which is an index of the adsorption activity of active carbons, as well as the specific area of the active carbon obtained was low.

In the cases where, by using such caking coals, it is intended to obtain such active carbons having a high adsorption activity as can be obtained by using non-caking coals, prolonged activation and other treatments would be necessary, and a decrease in productivity would not be avoided.

In Examples 3, 6, and 7 and Comparative examples 4, 5, and 3, the different coal compositions of Yallourn coal and/or Cerrejon coal were used, wherein the relative portion of one of them varying stepwise from 0% to 100%, while the average particle size being kept at 8 μm.

In Comparative example 5 and 3 wherein the coal composition having 75% of Cerrejon coal and only Cerrejon coal were used, respectively the carbonized granules were aggregated one another and foaming occurred.

The hardness of the active carbon obtained increased with the increase in the portion of the caking coal. However, the amount of iodine adsorbed, which is an index of the adsorption activity of active carbons as well as the specific surface area were decreased. The distinguished decreases in those were observed in Comparative example 4, 5, and 3, wherein the coal compositions having a caking coal content of not less than 50%.

Figure 2:
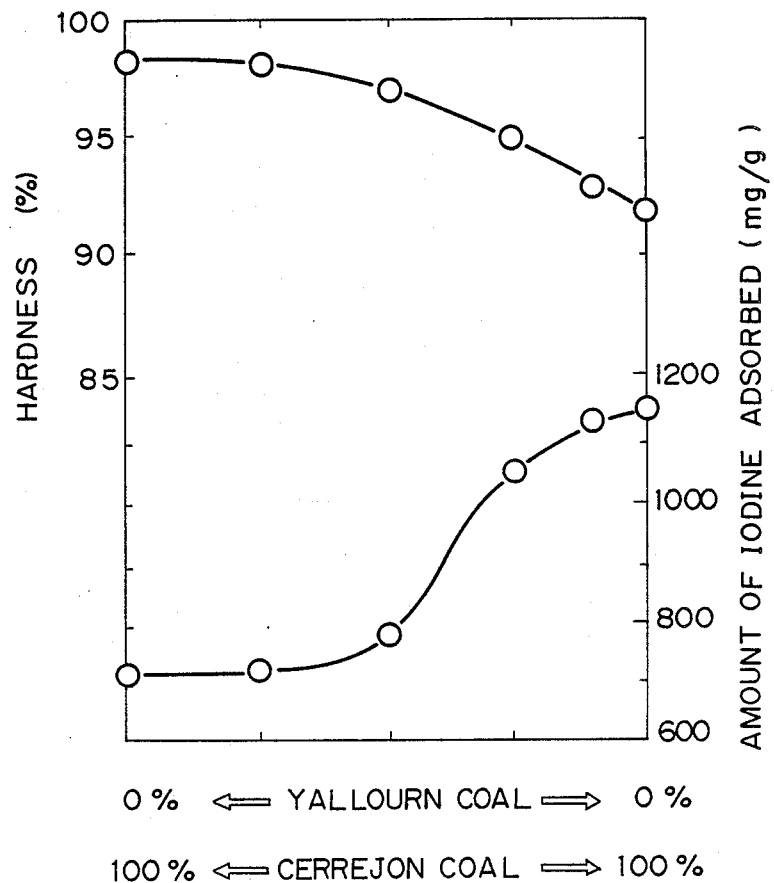
FIG. 2 is a graph showing the correlations of the hardness of the active carbons obtained and the amount of iodine adsorbed, respectively, with the portions of coal and Cerrejon coal.

The correlations of the hardness of the active carbons obtained and the amount of iodine adsorbed to them with the relative portion of Yallourn coal or Cerrejon coal are shown in FIG. 2.

The aggregation of the granules as well as foaming occurred in the cases where the granules obtained from the coal compositions having the caking Cerrejon coal content of not less than 75% were carbonized.

On the other hand, in Comparative example 4, wherein the content was 50%, neither aggregation nor foaming occurred though the amount of iodine adsorbed was still small as shown in the figure.

The figure also shows that the amount of iodine adsorbed sharply increases as the content of the caking coal becomes not more than 50%. In fact, in Example 6, wherein the content of the caking coal was 25%, the amount of iodine adsorbed was 1.053mg/g, which was close to that for the active carbon obtained from the 100% non-caking coal. In addition, the hardness of the active carbon obtained in Example 6 was 95%, which was higher than that of the active carbon obtained from the 100% non-caking coal in Example 3. The hardness of the latter was 92%.

As described above, the addition of caking coals to non-caking coals is effective for improving the hardness of spherically granular active carbons obtained. However, the adsorption activity as indicated by the amount of iodine adsorbed sharply decreases with increase in the content of caking coals. The sharp decrease occurs, especially in the range of the content up to 50%.

Granular active carbons that can be preferably used usually are those having an amount of iodine adsorbed of not less than 900 mg/g as an adsorption activity. It is preferred that the content of a caking coal is not more than 40% if the granular active carbons having an amount of iodine adsorbed in this range are intended.

What is claimed is:

1. A method for preparing granular active carbon having a hardness of at least 90% based on a method of measurement designated as JIS K 1474, which comprises:
   (a) a pulverization step of pulverizing a coal composition containing a coal consisting of a non-caking coal to form pulverized coal particles having an average particle size of not larger than 10 μm;
   (b) a granulation step of granulating the resulting pulverized coal particles to form spherical coal granules having a particle size of not less than 0.1 mm and a maximum of 10 mm;
   (c) a carbonization step of carbonizing the resulting coal granules; and
   (d) an activation step of activating the resulting carbonized coal granules.

2. The method as claimed in claim 1 wherein, in the granulation step, a binder selected from the group consisting of water and hydrocarbon oils having a low viscosity and giving a low carbon residue content after heating is used.

3. The method as claimed in claim 1 wherein, in the granulation step, the pulverized particles are granulated to spherical granules having particle sizes of not less than 0.5 mm and high sphericities.

4. The method as claimed in claim 1 wherein, in the carbonization step, the carbonization is carried out by heating the granules at a temperature of 500°–1,000° under an inert gas atmosphere.

5. The method as claimed in claim 1 wherein, in the activation step, the activation of the carbonized granules is carried out under the conditions of temperature of 800°–1,000° C., amount of the activator of 1–10 kg of steam per 1 kg of the carbonized granules, and activation time of 1 to 10 hours.

6. The method as claimed in claim 1, wherein in the granulation step, the spherical coal particles have a particle size of not less than 0.5 mm and a maximum of 10 mm.

7. The method as claimed in claim 1, wherein the granular active carbon has a specific surface area of not less than 1002 m$^2$/g and absorbs iodine in an amount of not less than 1053 mg/g.

8. A method for preparing granular active carbon having a hardness of at least 90% based on a method of measurement designated as JIS K 1474, which comprises:
   (a) a pulverization step of pulverizing a coal composition consisting of a non-caking coal and a caking coal whose content in the coal composition is not higher than 40% by weight to form pulverized coal particles having an average particle size of not larger than 10 μm;
   (b) a granulation step of granulating the resulting pulverized coal particles to form spherical coal granules having a particle size of not less than 0.1 mm and a maximum of 10 mm;
   (c) a carbonization step of carbonizing the resulting coal granules; and
   (d) an activation step of activating the resulting carbonized coal granules.

9. The method as claimed in claim 8, wherein, in the granulation step, a binder selected from the group consisting of water and hydrocarbon oils having a low viscosity and giving a low carbon residue content after heating is used.

10. The method as claimed in claim 8, wherein, in the granulation step, the pulverized particles are granulated to spherical granules having particle sizes of not less than 0.5 mm and high sphericities.

11. The method as claimed in claim 8, wherein, in the carbonization step, the carbonization is carried out by heating the granules at a temperature of 500°–1.000° C. under an inert gas atmosphere.

12. The method as claimed in claim 8 wherein, in the activation step, the activation of the carbonized granules is carried out under the conditions of temperature of 800°–1.000° C., amount of the activator of 1–10 kg of steam per 1 kg of the carbonized granules, and activation time of 1 to 10 hours.

13. The method as claimed in claim 8, wherein in the granulation step, the spherical coal particles have a particle size of not less than 0.5 mm and a maximum of 10 mm.

14. The method as claimed in claim 8, wherein the granular active carbon has a specific surface area of not less than 1002 m$^2$/g and absorbs iodine in an amount of not less than 1053 mg/g.

* * * * *